Oct. 4, 1955  W. F. HENNESSEY, JR., ET AL  2,719,876
CLAMPING AND SEALING DEVICE
Filed Sept. 30, 1953

INVENTORS
GEORGE J. SWANSON
WALTER F. HENNESSEY, JR.

BY *Bauer and Seymour*
ATTORNEYS

United States Patent Office 2,719,876
Patented Oct. 4, 1955

2,719,876

CLAMPING AND SEALING DEVICE

Walter F. Hennessey, Jr., Sidney, and George J. Swanson, Unadilla, N. Y., assignors to Bendix Aviation Corporation, New York, N. Y., a corporation of Delaware Application September 30, 1953, Serial No. 383,171

18 Claims. (Cl. 174—77)

This invention relates to coupling devices and the like and more particularly to means for clamping a cable, rod or the like at the end of a conduit or casing from which the cable emerges, in a substantially moisture-proof and mechanically secure manner.

This application is a continuation-in-part of our application Serial No. 247,678, filed September 21, 1951, for "Clamping and Sealing Device."

One of the objects of the present invention is to provide novel means for circumferentially clamping a cable or other generally cylindrical part and automatically center the same within a detachable coupling or clamping member through which the same extends from a conduit or other type of housing.

Another object of the invention is to provide a novelly constructed device for mechanically clamping an elongated member and simultaneously forming a substantially water-tight seal around the same and an opening through which the member extends into a closed space, such as a conduit.

Still another object is to provide a device of the above character wherein the parts cooperate in a novel manner to effect a circumferential seal and to prevent undesirable loosening and separation of the parts as a result of vibration or the like.

A further object is to provide novel circumferential clamping means for a cable or the like, which means are so constructed that the same may be readily applied to an insulated cable without danger of damaging or impairing the strength or efficiency thereof.

A still further object is to provide means which are novelly so constructed as to form a safe and substantially water-tight seal around a cable, tube or the like which passes therethrough, the clamping effect being attained by means of relatively rotating parts without subjecting the cable or other clamped part to any appreciable or undesirable twisting or torsional strain.

Another object is to provide a detachable cable clamping device wherein the clamping parts are locked in a novel manner against rotation relative to the rotating parts during assembly.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a side elevation view, partly in section and with parts broken away, showing one form of the novel clamping and sealing means comprehended by the present invention, the parts thereof being shown in partially disassembled relation and the section being taken substantially on line 1—1 of Fig. 2;

Figure 1:
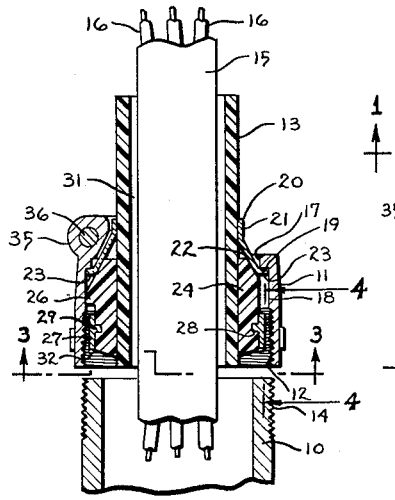
Figure 2:
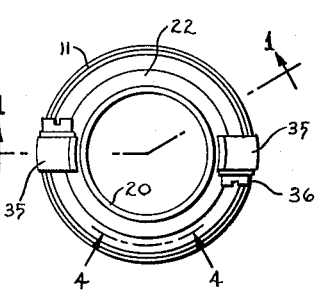
Fig. 2 is a top plan view of the device of Fig. 1 with the cable removed.
Figure 3:
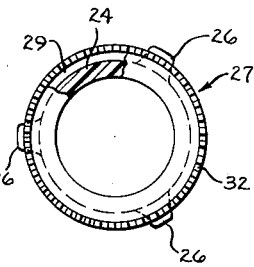
Fig. 3 is a detail end view of parts of the device of Fig. 1, a portion thereof being broken away substantially along line 3—3 of Fig. 1.
Figure 4:
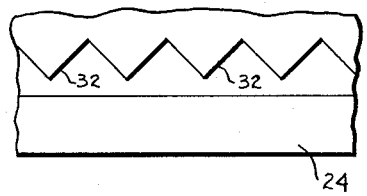
Fig. 4 is an enlarged detail view showing a broken away portion of the parts illustrated in Fig. 3, the view being taken along the lines 4—4 of Figs. 1 and 2.

The invention is illustrated in Figs. 1 to 5 of the accompanying drawings, by way of example, in the form of means for clamping a multiple conductor cable against detrimental longitudinal or axial movement relative to a part electrically connected therewith or relative to a conduit or other housing into which the cable extends and to substantially seal the opening in the conduit or other closure around the cable against the entrance of moisture, such as water. The construction is such as to provide mechanical locking against the accidental or undesirable loosening of the assembled parts which would render the seal ineffective. It will be understood, of course, that the cable may be replaced by other elongated bodies, such as rod, tube, etc., or even by a plurality of individual insulated conductors or the like. One very useful application of the invention is in combination with multiple contact plug and socket connectors, such as that disclosed in our Patent No. 2,662,219, issued December 8, 1953, for "Electrical Apparatus." The present invention may, for example, be employed in lieu of the self-centering clamping means disclosed in said prior-filed application.

In the specific embodiment of the invention illustrated, the fittings with which the novel clamping means are combined are shown in the simplest possible form as a rigid conduit 10 and a tubular collar or nut 11, the latter being internally threaded at 12 to cooperate with the external threads 14 on the conduit or other housing. Other known forms of connecting means for these fittings or coupling members may be used, such as a bayonet joint. Extending through nut 11 and into conduit 10 is the elongated body or means with respect to which the invention functions as clamping means, and as shown, the same is in the form of a multiple conductor cable 15 made up of one or a plurality of conductors 16. If the cable is small the space surrounding the same may be filled in with a resilient rubber tube 13. As a further specific example, the conduit 10 might be a portion of the shell of the plug or socket assembly of a single or multiple contact electrical connector adapted for housing a suitable insert for supporting plug or socket contacts to which the conductors 16 may be electrically connected by soldering or in any other suitable manner. Many such structures are known in the art, and it is accordingly believed to be unnecessary to specifically illustrate and describe the same in this application. One such structure is shown in our above-mentioned co-pending application wherein the connector shell may be considered as comparable to conduit 10 of the present disclosure.

The novel structure contemplated by this invention is effective to clamp or grip cable 15 within nut 11 with or without the sleeve 13 to prevent the transmission through or by the cable of any torsional or tensional strains or forces to the individual conductors 16 which might result in damage to or the severance of any connection of said conductors to other parts and to effect at the same time a suitable seal against the passage of water or other liquid into the conduit around the cable. In the form shown, fitting member or nut 11 has a differential bore therethrough comprising a small diameter bore 17, which may be quite short in the axial direction, and a larger diameter bore 18, said bores being joined by an internal shoulder 19. One or more axially extending ears 35 with set screws 36 threaded therein may be provided on nut 11 for the connection of locking or grounding wires. An adapter 20 in the form of a sleeve or tube is loosely mounted in collar or nut 11 and removably held in place therein in a manner to be hereinafter described. Said adapter sleeve comprises a reduced cylindrical end portion 21 and a tapered or cone-shaped portion 22 that flares outwardly from said cylindrical portion and terminates in a radial end flange 23 which in turn engages shoulder 19 to limit relative axial movement of members 11 and 20 in one direction, that is, to limit the movement of the adapter into the nut in one direction. If desired, this function may be accomplished by causing the tapered portion 22 of the sleeve to engage a similarly tapered or conical shoulder between the small and large diameter bores 17 and 18 within nut 11. If desired, only the inner surface or bore of portion 22 need be tapered.

Mounted in the enlarged bore 18 of nut 11 and projecting into the enlarged or tapered portion of adapter 20 is a compressible clamping and sealing grommet or sleeve 24 which is preferably made of a readily deformable plastic material, such as resilient natural or synthetic rubber. In its natural or unstressed condition, sleeve 24 has an inner cylindrical surface, the diameter of which is at least as great and preferably slightly greater than the outer diameter of cable 15 or sleeve 13, as the case may be, or other comparable part to be clamped. If desired, grommet 24 may be of the type having a plurality of passages, each passing a single insulated conductor 16. The external surface at the outer or upper end of sleeve 24, as viewed in the drawing, is preferably tapered and engageable with tapered bore portion 22 of adapter 20 with which it cooperates in a manner to hereinafter appear.

For the purpose of removably supporting or securing grommet or sleeve member 24 and adapter 20 in nut 11, resilient sleeve 24 may be provided with an external circumferential rib or flange means 26. The diameter of the latter in unstressed condition is somewhat greater than the inner diameter of bore 18 and hence, exerts a sufficient radial force against the inner wall of nut 11 to frictionally but removably hold sleeve 24 and hence adapter 20 in assembled relation with the nut. If desired, the flange means 26 may be in the form of a continuous annular flange or the same may be interrupted, i. e., in the form of a plurality of spaced projections or beads. This holding means will avoid accidental separation of the parts in normal usage without making it difficult to assemble and disassemble the same. Said means are desirable to facilitate handling during the application of the clamping means and to avoid separation, loss or incorrect assembly of the parts of the clamping means when the major parts of a complete assembly are disconnected for inspection, repair or the like.

In order to impart a desired amount of axial stiffness to the lower or inner portion of grommet 24, to limit or prevent undue radial expansion thereof under compressive stresses and to prevent engagement of the grommet with the threads 12, said inner end portion of the grommet is surrounded by a rigid or non-expansible sleeve or cylinder 27 which functions as a retainer to accomplish the purposes stated. Cooperable means on sleeve 24 in the form of an annular groove 28 which receives an internal radial flange 29 on retainer 27 are provided for securing said sleeve and retainer together for axial movement relative to nut 11 and adapter 20.

The inner or lower end of resilient sleeve 24 extends only a short distance beyond retainer sleeve 27 and is adapted to compressively engage the end of conduit 10 when nut 11 is applied thereto and thus form a watertight annular seal at this joint around the open end of the conduit. For a purpose to be next described, the outer diameter of resilient sleeve 24 is somewhat less than the outer diameter of conduit 10 and metal retainer sleeve 27 is of such size as to have end-to-end abutment with conduit 10 upon longitudinal compression of sleeve 24. The annular seal at the end of conduit 10 is improved and end-to-end contact of the sleeve 27 with the conduit is better assured if the end of sleeve 24 is tapered inwardly and downwardly from the end of retainer sleeve 27, as best seen in Fig. 1. Thus, when the parts are assembled, the greatest pressure or reaction between sleeve 24 and conduit 10 will occur at the junction of the inner and end surfaces of the conduit and there will thus result a line or circle of contact along which there will be relatively high specific pressure when the parts are assembled to insure a good annular seal.

Figure 5:
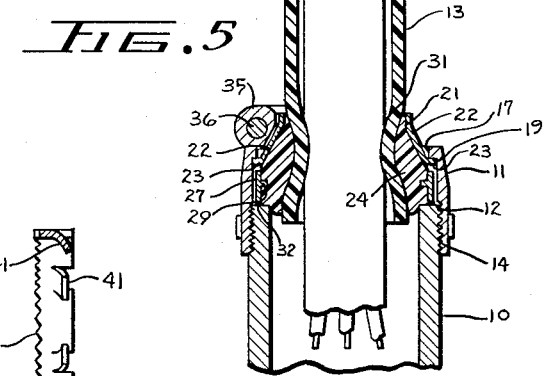
Fig. 5 is a view like Fig. 1 showing the parts of the device in assembled relation.

To render the clamping and sealing means operative with respect to the cable 13, 15, the nut 11 is screwed onto fitting or conduit 10, thereby first bringing the conduit into end-to-end engagement with the bevelled end of resilient clamping and sealing sleeve 24. Continued downward movement of the nut onto the conduit compresses sleeve 24 axially and causes the tapered upper end thereof to slide along and through tapered portion 22 of adapter 20 and to squeeze into the annular space 31 between cable 13, 15 and cylindrical bore portion 21 of the adapter (Fig. 5). Since the wall thickness of the major portion of that part of sleeve 24 thus moved into space 31 is greater than the radial width of the space, the sleeve will firmly grip the cable or conductors and be centered within the bores of the adapter and nut. At the same time, sealing engagements are effected between the sleeve 24 and cable 13, 15 and between sleeve and adapter, the sleeve wall being under radial compression between the cable and adapter. Inasmuch as the resilient sleeve 24 is free to move out through the end or top of adapter 20 and to expand its wall thickness within nut 11, the radial force exerted on the cable by the radially compressed portion of sleeve 24 within adapter portion 21 will depend to a large degree upon the nature and flowability of the resilient material used, and will be relatively constant for a given size cable and fitting, independently of the extent to which nut 11 is screwed on the conduit 10. Accordingly, all danger of doing harm to the cable by applying too great a pressure thereto is substantially eliminated by the present novel construction and the selection of a suitably pliable and flowable material for sleeve 24. The seal is completed by the axially compressive end-to-end engagement of sleeve 24 and conduit 10.

The cable 13, 15 and conduit 10 are usually stationary, and novel means are accordingly provided for preventing rotation of ring assembly 24, 27, or the transfer of an undesirably large torsional force through said assembly to the cable or conductors during rotation of nut 11 when the latter is being applied to conduit 10. For this purpose a suitable clearance is provided between adapter 20 and nut 11 except that flange 23 makes metal-to-metal low friction contact with shoulder 19. Even though these engaging surfaces are smooth and the friction is small, some torque or twisting moment will be transmitted to the cable. This transmission of torque is reduced to a minimum in a novel manner to be next described. During the assembly of parts in the manner described above and before the sleeve 24 has been sufficiently compressed radially to transmit a detrimental torque from nut 11 to the cable 13, 15, or the conductors, the lower end of sleeve 24 will have become compressed axially in an amount sufficient to permit end-to-end engagement of conduit 10 and retainer sleeve 27. The end of this retainer sleeve is roughened in any suitable manner to create high friction between it and the conduit. As shown, said end is notched or serrated to provide a plurality of sharp teeth 32 which will bite into the end of conduit 10 and thus absorb the torsional force transmitted by the sleeve assembly 24, 27 and prevent its application to the cable 13, 15, or to individual conductors passing therethrough. At the same time sleeve 24 is compressed axially to squeeze flange 29 and is expanded radially to frictionally engage the inner wall of sleeve 27 to assist in holding sleeve 24 against rotation with nut 11. The latter may thus be turned to cause it to advance axially on threaded conduit 10 without causing sleeve assembly 24, 27 to turn after the latter has been compressed into gripping engagement with cable 13, 15. If desired, nut 11 may be tightened until ring 27 is pressed tightly between conduit 10 and flange 23.

The filler or shim tube 13 is used only when the cable 15 is so small that sleeve 24 will not satisfactorily fill the space 31 when under suitable compression. If desired, more than one compensating or shim tube may be used. These tubes or cylinders are preferably made of rubber or similar compressible or yieldable material and may have a sliding fit in adapter 20, or the same may fit closely onto the cable itself. As a general rule, the use of the compensating tubes 13 may be and preferably is avoided by selecting a smaller size fitting and clamping device when the cable or other part to be clamped is small. When grommet 24 has a separate hole or passage for each of several individual conductors 16, shim tubes 13 are not used.

Figure 6:
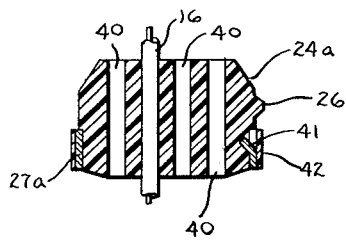
Fig. 6 is an enlarged sectional view of a modified form of grommet-sleeve combination which may be employed in lieu of the corresponding parts in Figs. 1 and 2.
Figures 7, 8:
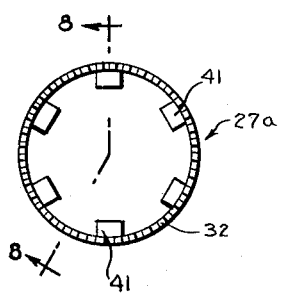
Fig. 7 is a bottom end view of the rigid sleeve of Fig. 6.
Fig. 8 is a sectional view taken substantially on line 8—8 of Fig. 7.

A modified form of grommet and sleeve combination, which may be used with parts 10, 11 and 20 in the place of resilient grommet 24 and rigid sleeve 27, is illustrated in Figs. 6 to 8. As shown, said combination comprises a resilient grommet 24a which is substantially like tubular grommet 24 except that the external groove 28 is eliminated and the center portion is provided with a plurality of passages 40 through each of which individual insulated conductors 16 may be slidably extended when the grommet is unstressed. Grommet 24a may, of course, be of sleeve form with a single passage to receive either a cable 15 or an individual conductor 16. Corresponding features of grommets 24 and 24a are identified by the same numerals.

Rigid sleeve 27a which surrounds the major part of the lower portion of grommet 24a performs the same functions as sleeve 27, but is constructed somewhat differently. As shown, sleeve 27a consists of a thin metal cylinder having portions of the upper margin thereof bent inwardly to form tongues 41 and the entire sleeve may be molded into or otherwise wholly or partially embedded in grommet 24a. The sleeve is thus securely anchored to the grommet. The serrated end of sleeve 27a may, but need not, be slightly embedded in the grommet. The points of the teeth or serrations 32 should not be covered by the material of the grommet to a depth of more than about .013 inch. These teeth should be able to cut through the end face of the grommet and engage the end surface of conduit 10 when the parts are assembled as in Fig. 5. The outer surface of sleeve 27a may be covered or not by a thin layer 42 of the outer surface of the grommet. This provides a seal at the end surface of conduit 10, both internally and externally of sleeve 27a.

There is thus provided a novel clamping and sealing device for cables, or conductors, or similar elements which is rendered operative by axial movement and radial compression of a resilient sleeve effected by means of a rotating part, the construction being such as to minimize the undesirable transmission of torsional forces created by friction between relatively rotating parts. A novel device is comprehended whereby a cable, a plurality of conductors or the like may be circumferentially gripped and, in the case of a cable, centered in a passage therefor without material danger of damaging the cable by inadvertent application and maintenance of excessive pressure thereon. Said device also constitutes an adequate sealing and closure means around a cable, insulated conductors, or the like for the openings through which the same extend in a fitting, conduit, bulkhead or the like.

Although only a limited number of embodiments of the invention have been illustrated in the accompanying drawings and described in the foregoing specification, it is to be expressly understood that the invention is not limited thereto. For example, the invention in its broader aspects may be adapted for use in other fields, such as in the fields of stuffing boxes and packing around rotating or reciprocating parts wherein other kinds of known materials for some of the elements may be found useful. In some applications of the invention it may be desirable to make sleeve 24 of yieldable or compressible material which is non-resilient and, if desired, said sleeve may have a plurality of smaller holes therethrough for receiving individual conductors as shown in Fig. 6. It may also be desirable to employ a sleeve or grommet with a single opening, such as grommet 24, to clamp a bundle of individual insulated conductors, but in this event moisture would not be effectively sealed out. If desired, it may be effective and useful in some cases to bond the sleeves 24 and 24a to the rings 27 and 27a for further insuring against relative movement thereof. This bonding may be effected by means of cement, one such cement being commercially known as "Parlon." The latter may be applied as a coating to the metallic ring before it is molded into the sleeve. If a good bond is effected, the other means for holding the sleeve and ring against relative movement may be dispensed with. Additionally, other changes, such as in the specific shapes and sizes of the parts illustrated, may be made without departing from the spirit, scope and objects of the invention, as will now be apparent to those skilled in the art.

What is claimed is:

1. Apparatus of the class described for attachment to a metallic conduit or the like around at least one elongated body, such as an insulated conductor, projecting from the conduit, comprising a tubular nut threadedly engageable with the conduit and having a reduced bore at the outer end thereof remote from the conduit, a tubular adapter comprising an external flange engageable with an internal shoulder in said nut, a cylindrical end portion of smaller diameter than said reduced bore and a tapering central portion joining said flange and end portion, a sleeve of resilient material within said nut and adapter and having a wall at the outer end thereof sufficiently thick to engage the elongated body and said cylindrical end portion of the adapter under radial compression, and a rigid retaining ring within said nut comprising a cylindrical portion closely surrounding an inner end portion of said sleeve and internally projecting means extending into the body of said sleeve, the end surface of said ring remote from the adapter being notched to provide a series of sharp teeth, whereby the inner end of said sleeve and the notched end of said ring are engageable by the end of said conduit upon compression of the sleeve.

2. Apparatus as defined in claim 1 wherein said sleeve has an external annular groove in the outer surface thereof and said internally projecting means is an internal flange extending into said groove.

3. Apparatus as defined in claim 1 wherein the internally projecting means of the ring are circumferentially spaced tongues embedded in the wall of said sleeve.

4. In a clamping device, a tubular nut having a differential bore therethrough and an internal shoulder, a rigid tubular adapter loosely mounted in said nut for rotation relative thereto, said adapter comprising a cylindrical end portion of smaller diameter than the reduced bore of the nut, an external flange engageable with said internal shoulder and a tapering central portion joining the flange and cylindrical end portion, a sleeve of resilient material in the enlarged bore of said nut, said sleeve having an external diameter greater than the diameter of said cylindrical end portion of the adapter and at least an end portion of said sleeve adjacent the adapter having a diameter less than the diameter of the enlarged end of said tapering bore portion of the adapter, and a rigid ring closely surrounding an end portion of said sleeve remote from said adaptor within said nut, said ring and sleeve being operatively connected to each other for preventing relative axial bodily movement thereof and the end surface of said ring remote from said adapter being notched to form V-shaped teeth thereon.

5. A clamping device as defined in claim 4 wherein the connection between said sleeve and ring comprises an annular groove in the outer surface of said sleeve and an internal flange on said ring extending into said groove.

6. A clamping device as defined in claim 4 comprising circumferentially spaced projections on the ring embedded in the wall of said sleeve to prevent relative rotation of said sleeve and ring.

7. A clamping device as defined in claim 4 wherein the sleeve is molded onto said ring and the latter is substantially embedded in said sleeve.

8. A clamping device as defined in claim 4 wherein said ring is securely bonded to said sleeve.

9. A clamping device as defined in claim 8 wherein the bonding medium is a cement having affinity for both the sleeve and the ring.

10. A clamping device as defined in claim 4 wherein said sleeve has resilient means projecting radially therefrom into frictional engagement with the internal wall of said enlarged bore to yieldably hold said sleeve in said nut.

11. A device as defined in claim 4 wherein the end of the resilient sleeve when the latter is unstressed projects a short distance beyond the teeth on said ring.

12. A device as defined in claim 11 wherein said projecting end of the resilient sleeve when the latter is unstressed is tapered inwardly and axially away from said ring.

13. In apparatus of the class described, a grommet of resilient material having at least one passage therethrough and a retainer ring closely surrounding an end portion of said grommet, one end of said ring being close to one end of said grommet and having the end edge thereof notched to form teeth projecting axially therefrom, said ring and grommet having cooperating means thereon for holding said ring against movement axially of said grommet, said cooperating means comprising an internal flange on said ring engaging an external groove in said grommet, and said grommet having integral external rib means thereon adjacent the other end of the ring and extending radially beyond the external surface of the ring.

14. In apparatus of the class described, a grommet of resilient material having at least one passage therethrough and a retainer ring closely surrounding an end portion of said grommet, one end of said ring being close to one end of said grommet and having the end edge thereof notched to form teeth projecting axially therefrom, said teeth being wholly within the periphery of the major portion of said ring, and said ring and grommet having cooperating means thereon for holding said ring against movement axially of said grommet.

15. In apparatus of the class described, a grommet of resilient material having at least one passage therethrough and a retainer ring closely surrounding an end portion of said grommet, one end portion of said ring being cylindrical and close to one end of said grommet, and the end edge of said cylindrical end portion being notched to form V-shaped teeth thereon, said teeth being so formed as to not extend radially outward beyond the periphery of the major portion of said ring and said ring and grommet being secured together to hold said ring against axial and rotary bodily movement relative to said grommet.

16. Apparatus as defined in claim 15 wherein said grommet has integral external flange means thereon adjacent the other end of the ring and extending radially beyond the external surface of the ring.

17. Apparatus as defined in claim 15 wherein said grommet and ring are bonded together by a bonding medium, such as a cement having affinity for both the grommet and the ring.

18. Apparatus as defined in claim 15 comprising circumferentially spaced projections on the ring embedded in the wall of said grommet to prevent relative rotation and relative axial movement of said grommet and ring.

References Cited in the file of this patent

UNITED STATES PATENTS

| | | |
|---|---|---|
| 619,235 | Schwarting | Feb. 7, 1899 |
| 2,402,050 | Ingalls | June 11, 1946 |